United States Patent [19]
Guy

[11] 3,847,172
[45] Nov. 12, 1974

[54] FLUID FEED SYSTEMS

[75] Inventor: Kenneth Theodore Guy, Ruislip, England

[73] Assignee: Lucas Aerospace Limited, Birmingham, England

[22] Filed: Mar. 12, 1973

[21] Appl. No.: 340,037

[30] Foreign Application Priority Data
Mar. 10, 1972 Great Britain.................... 11183/72

[52] U.S. Cl. .............................................. 137/100
[51] Int. Cl...................... G05d 11/03, F16k 19/00
[58] Field of Search.................................... 137/100

[56] References Cited
UNITED STATES PATENTS

| | | | |
|---|---|---|---|
| 1,558,529 | 10/1925 | Wunsch | 137/100 |
| 1,680,750 | 8/1928 | Smoot | 137/100 |
| 3,092,127 | 6/1963 | Bracken | 137/100 X |

FOREIGN PATENTS OR APPLICATIONS

| | | | |
|---|---|---|---|
| 392,529 | 5/1933 | Great Britain | 137/100 |

Primary Examiner—Robert G. Nilson
Attorney, Agent, or Firm—Holman & Stern

[57] ABSTRACT

The invention relates to a fluid feed system for supplying a fluid consumption unit from at least two fluid pressure sources and comprising branch conduits for connection to said fluid pressure sources respectively and a main conduit to which said branch conduits are connected at their downstream ends the main conduit being connected to said fluid consumption unit. A flow regulating valve in each branch conduit, each flow regulating valve including a flow control element operable by a piston or the like to which can be applied a pressure variable to control the setting of the flow control element, and means for varying the pressures acting on the pistons or the like to maintain substantially equal flow rates in said branch conduits.

16 Claims, 5 Drawing Figures

FLUID FEED SYSTEMS

This invention relates to fluid feed systems for supplying a fluid consumption unit from at least two fluid pressure sources and the object of the invention is to provide such a system in a simple and convenient form.

A fluid feed system in accordance with the invention comprises in combination, branch conduits for connection to said fluid pressure sources respectively, a main conduit to which said branch conduits are connected at their downstream ends, said main conduit in use, being connected to said fluid consumption unit, a flow regulating valve in each of said branch conduits, each flow regulating valve including a flow control element operable by a piston or the like to which can be applied a pressure variable to control the setting of the flow control element, and means for varying the pressure acting on the pistons or the like to maintain substantially equal flow rates in said branch conduits.

Examples of systems in accordance with the invention will now be described with reference to the accompanying drawings in which.

Figure 1:
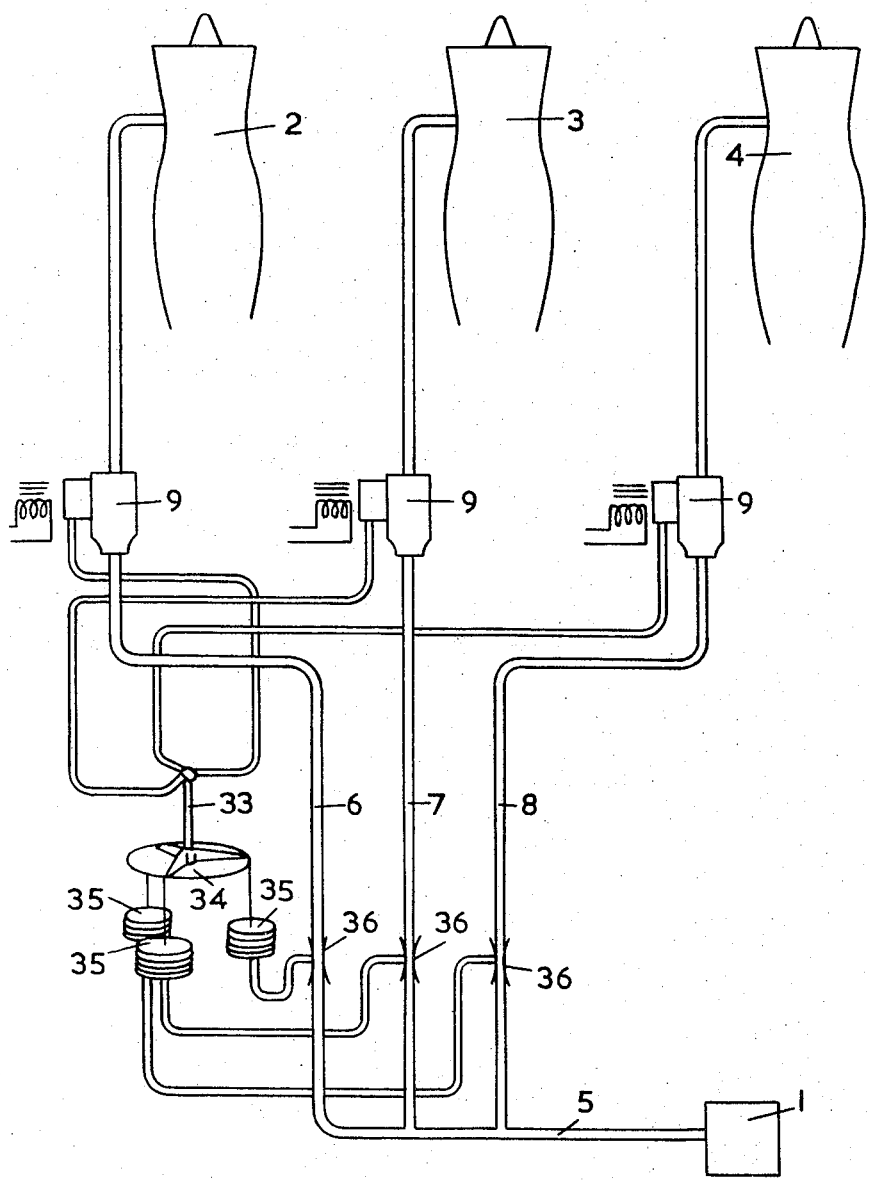
FIG. 1 is a schematic layout of one example of the system.

In FIG. 1 of the drawings there is shown a fluid feed system for supplying a consumption unit 1 with air under pressure from three sources referenced 2, 3, 4. The consumption unit is the winch of a helicopter and the fluid pressure sources are engines forming part of the helicopter propulsion system. A main conduit 5 supplies air under pressure to the winch and branch conduits 6, 7 and 8 connect outlets from the compressor stages of the engines, to the main conduit 5. In order to ensure substantially equal flow of air from each engine each branch conduit incorporates a regulating valve 9, the valves being of identical construction and being shown in greater detail in FIG. 5.

Figure 5:
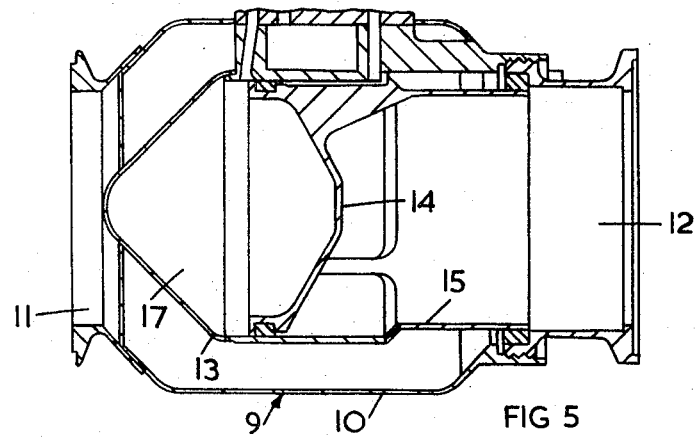
FIG. 5 shows another part of the system of FIG. 1.

Referring to FIG. 5 each valve 9 comprises an outer casing 10 of annular form and which intermediate its ends, is of enlarged diameter. The casing 10 forms part of the respective branch conduit and one end of the casing forms an inlet 11 whilst the other end forms an outlet 12.

Mounted by means of legs within the casing is a cup shaped member 13 having its closed end directed towards the inlet 11. The inner wall of the cup shaped member constitutes a bearing surface for a piston 14 which has a ported skirt portion 15. The skirt portion extends towards the outlet 12 and is guided by means of a seal assembly 16.

The rim of the cup shaped member 13 forms a seating with which co-operates in the closed position of the valve, a complimentarily shaped surface on the skirt of the piston. Moreover, when the skirt is in the closed position thereby to prevent flow of air from the inlet to the outlet of the valve, air under pressure from the inlet of the valve acts upon a surface of the skirt to urge the latter into contact with the seating.

The piston 14 together with the base wall of the cup shaped member 13 define a chamber 17 to which air under pressure can be admitted to effect opening of the valve this being achieved by moving the piston and its skirt towards the outlet 12. When this occurs the final position of the piston is determined by the force exerted on the piston 14 due to the pressure of air within the chamber 17 balanced by the force acting on the piston in the opposite direction and due to the pressure at the outlet 12 of the valve and also due to the pressure at the inlet acting upon the small annular surface of the skirt 15 which is exposed to the inlet pressure. Hence for a given pressure within the chamber 17 a corresponding outlet pressure at the outlet 12 will exist and the valve element will move to control this outlet pressure, until equilibrium of the forces mentioned above is achieved.

Figure 4:
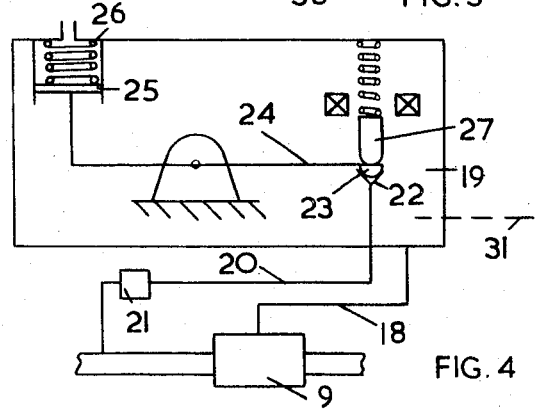
FIG. 4 shows a part of the system of FIG. 1

Referring now to FIG. 4 there is shown in diagrammatic form, the control mechanism which determines the pressure which is supplied to the chamber 17 of the valve. The valve is indicated at 9 it being positioned in one of the branch conduits and a pipe 18 communicates with the chamber 17 of the valve. The pipe 18 at its other end communicates with a chamber 19 to which air is admitted through a pipe 20 which is connected at its opposite end to the upstream side of the valve 9. A filter 21 is provided in the pipe line 20 to filter the air supplied therethrough. At its end within the chamber 19 the pipe line 20 terminates in an orifice 22 and associated with this orifice is a closure member in the form of a half sphere 23. The sphere is mounted upon a pivoted lever 24 and the other end of the lever is connected to a piston 25 which is slidable within a bore defined in the chamber 19. The bore at its outer end is in communication with the atmosphere and a spring 26 is interposed between the piston and the wall of the chamber 19. It will be noted that the effect of the spring 26 is to lift the sphere 23 from the orifice 22 thereby to allow air under pressure to enter the chamber 19. When this occurs however air under pressure also acts upon the piston 25 to effect movement of the lever against the action of the spring 26. An equilibrium is established so that the pressure within the chamber 19 is controlled at a prescribed value and this pressure is supplied to the chamber 17 of the valve 9. The arrangement is such that with the predetermined pressure in the chamber 17, the valve 9 will adjust itself to provide a predetermined pressure downstream thereof.

Also associated with the lever 24 is a solenoid operable plunger 27, this being spring loaded into contact with the lever 24 and acting to urge the sphere 23 onto the orifice 22 so that no air enters the chamber 19. When the solenoid is energised the plunger 27 is removed from the lever 24 so that the mechanism can operate as described above. When the plunger 27 is in contact with the lever 24, the pressure of air within the chamber 19 is very small and certainly not sufficient to effect opening of the valve 9. The piston 14 is therefore urged so that the skirt contacts the seat by virtue of the pressure of air at the inlet of the valve 9 acting upon the annular portion of the skirt which is exposed to this pressure.

The system thus far described takes no account of the flow of air from each engine and even though the pressures downstream of the valves may be substantially equal this does not mean that the flow from each engine or source is the same. In order to provide for substantially equal flow from each engine there is provided means whereby the flow of air in each conduit can be detected. If for instance it is found that conduit 6 is conveying more air than conduit 7 and 8 then the valve 9 in conduit 6 is closed slightly to make the flows substantially equal. The closure of the valve 9 is achieved by adjusting the pressure within the chamber 17 of the valve and this is effected by means of a valve shown particularly in FIG. 2. The valve is shown at 30 and is connected by way of a pipeline 31 to the chamber 19 of its associated valve. The valve 30 includes a spring loaded valve element 32 which under the action of the spring is urged to the closed position however, the valve element 32 can be moved against the action of its spring as will be described, and this allows air to flow from the chamber 19 along the pipeline 31 to escape to the atmosphere. The effect of this flow of air is to modify the pressure within the chamber 19 and therefore in the chamber 17 of the valve.

The modification of the pressure within the chamber 19 occurs because the force exerted by the spring on the piston 25 depends upon the length of the spring. Consider the situation when the associated valve 30 is suddenly opened. When this occurs there will be an immediate lowering of the air pressure within the chamber 19 owing to the increased flow of air from the chamber. The force acting on the piston in opposition to the spring force is as a result reduced and the lever 24 is moved by the spring so that the sphere 23 is lifted from the orifice. This allows an increased flow of air into the chamber and the pressure within the chamber is partly restored to its original value. The pressure is not however completely restored because of the need for the sphere 23 to be lifted further from the orifice 22 to provide for the increased flow of air. The piston 25, the lever 24 and the sphere 23 assume a new equilibrium position with the spring have a slightly increased length and therefore exerting a reduced force.

Figure 2:
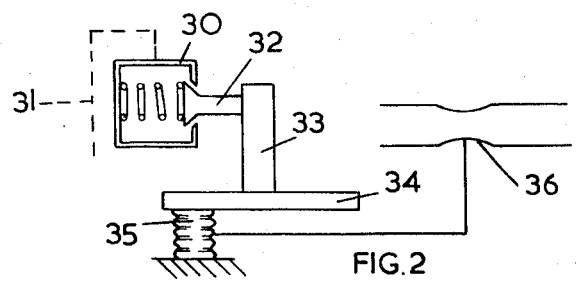
FIG. 2 shows in greater detail a portion of the system of FIG. 1.
Figure 3:
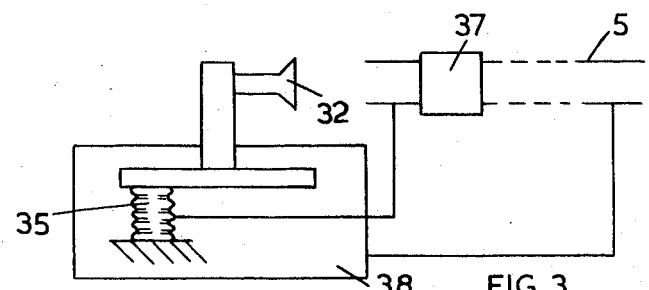
FIG. 3 is a view similar to FIG. 2 showing a portion of an alternative form of system.

The fact that the flow of air reduces slightly the pressure in the chamber 17 allows the piston 14 to move the skirt 15 to effect a small degree of closure of the valve. In FIG. 2 the valve 30 is shown slightly open but this is for the purpose of illustration only. When the flows in the branch conduits are equal the valves 30 will be closed and it is only when unbalanced flow occurs that one of the valves 30 is opened to correct the unbalanced flow. This statement assumes that the flows in the other two conduits are equal but in the event that the flows in the three conduits are unequal then two of the valves will be open one to a greater degree than the other.

The valve elements 32 of the valves 30 are actuated by means of a peg 33 which extends axially of a circular plate 34. The plate 34 is universally mounted so that the peg 33 can tilt in any direction. The valve members 32 of the valves 30 extend along radii of the peg 33 and are equiangularly spaced thereabout. This is shown diagrammatically in FIG. 1. Also shown in FIG. 1 is the disposition of three bellows elements 35 which are disposed on the opposite side of the plate to the peg 33 and are connected to the periphery thereof at equiangularly spaced points. The ends of the bellows 35 remote from the plate 34 are fixed and as shown in FIGS. 1 and 2 the interiors of the bellows are connected to venturis 36 respectively formed in each branch conduit. The arrangement is such that when the flows in each branch conduit are equal then the pressure at the throats of the venturis will be equal and so an equal force will be exerted by each bellows on the plate 34 and the peg 33 will remain in the vertical position. In the event however that the flow through one of the venturis should increase then the pressure within the respective bellows unit will fall and the plate 34 will be tilted to effect opening of the appropriate valve 30 and thereby a reduction in the flow rate in the particular branch conduit.

As an alternative to the use of a venturi in each branch conduit, there may be incorporated in the branch conduit a flow restricting element 37. In this case the respective bellows 35 are connected to points upstream of the flow restricting elements 37 and the bellows are enclosed within a chamber 38 the interior of which is in communication with a point in the main conduit 5. In this case therefore each bellows 35 senses the pressure drop across the flow restricting element, the pressure drop being a function of the flow. In this case the bellows will expand with increasing flow and therefore the bellows 35 must be positioned diametrically opposite the respective valves 30 in order for the correction to be effected. It will be appreciated that with this arrangement the flow restricting element 37 may be a predetermined length of branch circuit.

It will be appreciated that if one of the engines should fail then the valve 9 associated therewith will close automatically of its own accord because the pressure in its chamber 17 will fall to substantially atmospheric pressure. When this occurs the total flow required by the hoist 1 will be made up by the other two engines, the flows from these two engines being proportioned as described.

It will further be appreciated that the solenoids of each valve 9 may be modified so that the energisation of the coil urges the plunger 27 into contact with the lever 24 and assists the action of the piston 25 in closing the half sphere 23 onto the orifice 22. Also the solenoid 25 may exert a thrust as a function of applied current to enable different pressures to be electrically signalled and obtained for operating the hoist.

Moreover, the plate 34 can be of any configuration providing that when the flows are equal, the valves 30 are in the closed position. The plate 34 may be centrally pivoted and the peg 33 omitted. With this arrangement the valve elements 32 of the valves 30 can be mounted directly upon the plate.

I claim:

1. A fluid feed system for supplying a fluid consumption unit from at least three fluid pressure sources and comprising in combination, branch conduits for connection to said fluid pressure sources respectively, a main conduit to which said branch conduits are connected at their downstream ends, said main conduit in use, being connected to said fluid consumption unit, flow regulating valves in said branch conduits respectively, each flow regulating valve including a flow control element, a piston forming part of each flow regulating valve and to which can be applied a control pressure variable to determine the setting of the flow control element, each flow regulating valve including pressure regulating means for providing the control pressure of the respective valve, a tiltable plate, pressure responsive devices equal in number to the number of branch conduits, said pressure responsive devices being coupled to said plate at equiangularly spaced positions about a central axis, flow detecting means associated with the branch conduits respectively, each flow detecting means providing a sensing pressure representative of the flow rate through the respective branch conduit, passage means through which the sensing pressures produced by the flow detecting means are applied to the pressure responsive devices respectively whereby if the flow rates through the branch conduits are substantially equal the plate will remain in an untilted position but if one or more of the flow rates should vary the plate will be tilted, and control valves equal in number to the number of branch conduits, each control valve including a valve element which is operatively connected to the tiltable plate, each control valve acting when operated by tilting of the plate, to modify one of the aforesaid control pressures, the valve elements being operatively connected to plate at positions such that a reduction or increase in the flow of air in one branch conduit effects adjustment of the flow regulating valve in said one branch conduit, thereby to maintain substantially equal flow rates in said branch conduits.

2. A system as claimed in claim 1 in which said flow detecting means comprises venturis disposed in the branch conduits respectively the pressure in the throats of said venturis forming said sensing pressures respectively.

3. A system as claimed in claim 1 in which said pressure responsive devices comprises bellows respectively, the interiors of said bellows being connected to the throats of the respective venturis and the exteriors of the bellows being subjected to atmospheric pressure.

4. A system as claimed in claim 1 in which said flow detecting means comprises portions of said branch conduits respectively said pressure responsive devices being subjected to the difference in pressure between a common point in said main conduit and points in said branch conduits upstream of said portions respectively, the portion of said conduits acting as or including flow restrictors.

5. A system as claimed in claim 4 in which said pressure responsive devices comprise bellows respectively the interiors of said bellows being subjected to the pressure upstream of said portions of the branch conduits respectively and the exteriors of said bellows being subjected to the pressure at said common point.

6. A system as claimed in claim 1 in which each regulating means includes an adjustable orifice through which fluid flows to act on the piston of the associated flow regulating valve, the pressure downstream of said orifice being modified by operation of the respective control valve.

7. A system as claimed in claim 6 including a valve element movable to control the effective size of the orifice.

8. A system as claimed in claim 7 including resilient means acting to move said valve element to increase the effective size of the orifice and means responsive to the pressure downstream of the orifice for moving the valve element in opposition to the force exerted by said resilient means.

9. A system as claimed in claim 8 including further means operable to prevent flow through said orifice thereby to effect closure of the associated flow regulating valve.

10. A system as claimed in claim 9 in which said further means comprises spring means and a solenoid operable member.

11. A system as claimed in claim 10 which said solenoid operable member is biased by said spring means to prevent flow through the orifice, the solenoid when energised, moving said member against the action of the spring means to permit flow through the orifice.

12. A system as claimed in claim 10 in which the solenoid when energised moves the valve element to prevent flow through the orifice, said spring means acting to move the valve element to permit flow through the orifice.

13. A system as claimed in claim 6 in which the orifice on its upstream side is connected to the respective branch conduit upstream of the respective flow regulating valve.

14. A system as claimed in claim 13 including a filter disposed between said conduit and said orifice.

15. A system as claimed in claim 8 including a pivotal lever, said valve element being mounted at one end of said lever the other end of said lever being connected to a piston constituting the means responsive to the pressure downstream of the orifice.

16. A system as claimed in claim 1 including a peg extending substantially at right angles, to said plate said stem effecting operation of the valve elements to modify the pressure acting on the pistons.

* * * * *